United States Patent [19]

Sweet

[11] 4,034,143
[45] July 5, 1977

[54] THERMAL DEFERRED ACTION BATTERY WITH INTERCONNECTING, FOLDABLE ELECTRODES

[75] Inventor: Roger G. Sweet, New Canaan, Conn.

[73] Assignee: Catalyst Research Corporation, Baltimore, Md.

[22] Filed: Feb. 24, 1960

[21] Appl. No.: 10,798

[52] U.S. Cl. .............................. 429/112; 429/211; 429/153

[51] Int. Cl.² ........................................ H01M 6/36

[58] Field of Search ............... 136/90, 90.5, 4, 5; 429/112, 211, 153

[56] References Cited

UNITED STATES PATENTS

| 856,162 | 6/1907 | Kitsee | 136/90.5 |
|---|---|---|---|
| 963,852 | 7/1910 | Benko | 136/86.2 |
| 2,422,045 | 6/1947 | Ruben | 136/130.1 |
| 2,462,880 | 3/1949 | Mandel | 136/118 |
| 2,519,527 | 8/1950 | Wilkinson | 136/132 |
| 2,564,495 | 8/1951 | Mullen | 429/119 |
| 2,631,180 | 3/1953 | Robinson | 136/153 |
| 2,632,782 | 3/1953 | Coleman et al. | 136/125 |
| 2,690,465 | 9/1954 | Broder | 136/153 |
| 2,696,513 | 12/1954 | Lehomer | 136/153 |
| 2,798,895 | 7/1957 | Nowotny | 136/133 |
| 2,847,493 | 8/1958 | Smyth et al. | 136/153 |
| 3,575,714 | 4/1971 | Bennett et al. | 429/112 |
| 3,884,719 | 5/1975 | Evans et al. | 429/112 |
| 3,972,734 | 8/1976 | King | 136/90 |

OTHER PUBLICATIONS

"Handbook of Chemistry & Physics," 36th Ed., p. 1651, Chemical Rubber Publishing Co., Cleveland Ohio.
Goodrich et al. "J. Electrochem. Soc.," 99, pp. 207c and 208c (1952).
McKee, "Tenth Annual Battery Research & Development Conf.," pp. 26–28 (May 23, 1956).

Primary Examiner—Edward A. Miller
Attorney, Agent, or Firm—Brown, Murray, Flick & Peckham

EXEMPLARY CLAIM

1. A thermal cell electrode composed of a thin metal sheet in the form of two laterally spaced members integrally connected at adjacent edges by a strip, a first of said members being in the shape of a pair of isosceles triangles joined through their bases and in which the apex of the equal sides of one of said triangles is truncated, and the other of said members defining a truncated triangle smaller than the truncated portion of said first member.

3 Claims, 10 Drawing Figures

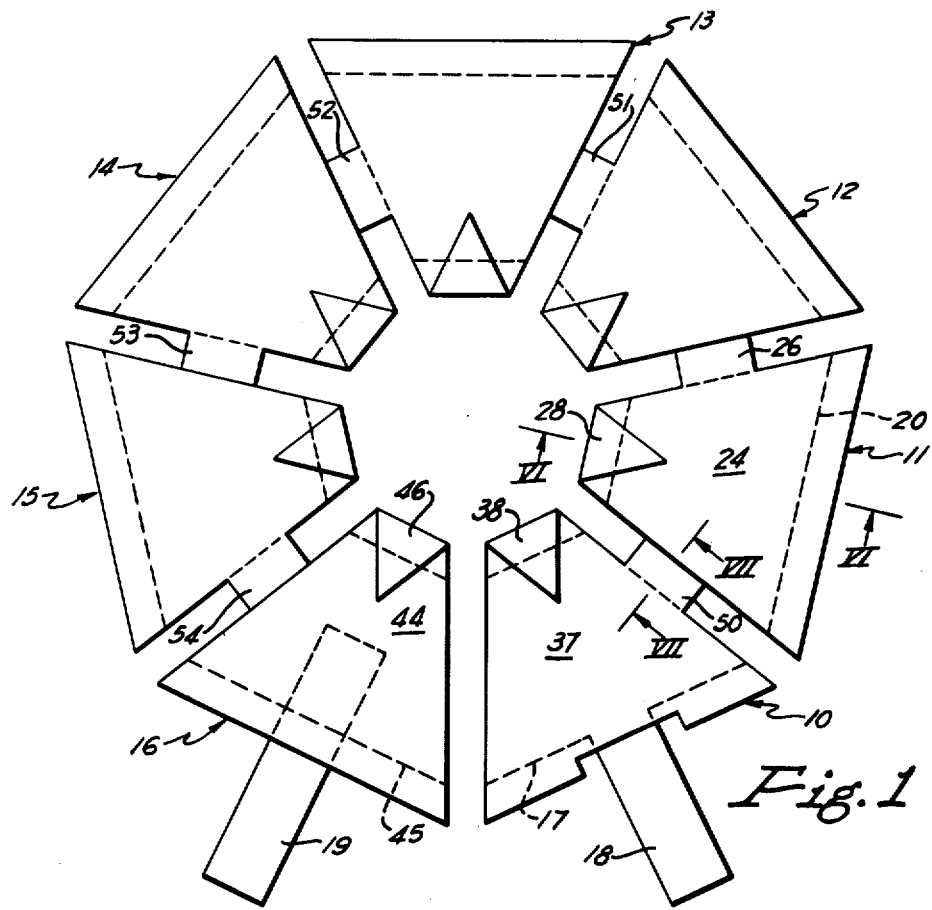
Fig.1
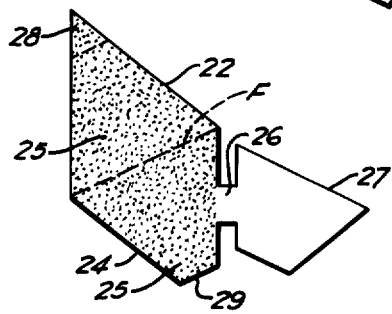
Fig.2
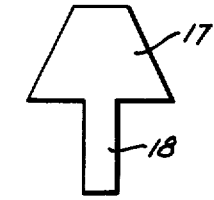
Fig.4
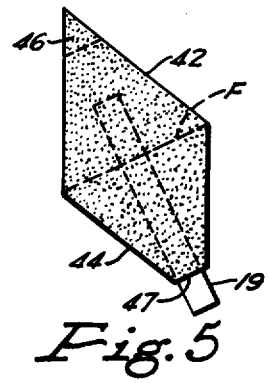
Fig.5
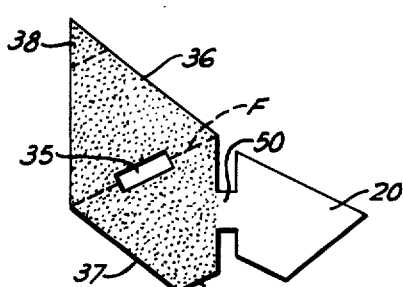
Fig.3
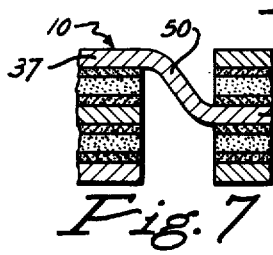
Fig.6
Fig.7
INVENTOR.
ROGER G. SWEET
BY Brown, Critchlow,
Flick & Peckham
HIS ATTORNEYS INVENTOR.
ROGER G. SWEET
BY Brown, Critchlow,
Alick & Peckham
HIS ATTORNEYS

THERMAL DEFERRED ACTION BATTERY WITH INTERCONNECTING, FOLDABLE ELECTRODES

This invention relates to thermal type deferred action cells and batteries.

Thermal type deferred action cells and batteries are characterized by being inactive at normal atmospheric temperatures, and become active only upon heat being supplied thereto. Such cells include at least one positive plate and one negative plate and an electrolyte that is solid and inactive at ordinary temperatures but which becomes functionally active when heat is supplied, usually but not necessarily, in an amount sufficient to melt, or fuse, the electrolyte. Such cells become and remain active only while the electrolyte is hot.

A major object of the present invention is to provide thermal type deferred action cells and batteries that can be made extremely compact and of small size, that can be produced, in the instance of batteries, having very high electromotive force (emf), and that are characterized by being durable, of long shelf life, and shock resistant.

In accordance with this invention, such thermal cells are formed of an electrode of one metal that is enclosed with an envelope of another metal, with an appropriate electrolyte disposed between the two. In the preferred embodiment a metallic electrode blank is coated, in part, with a sufficient metal to provide positive and negative areas of the same blank. Such a blank is then folded about to enclose an electrode of, for example, the uncoated base metal in such manner that the coating metal is opposite, or facing the enclosed electrode. The electrolyte is disposed between the inner, coated face of the blank and the enclosed electrode. In this general manner, a very compact and rigid cell structure is provided that may be developed, in a manner hereinafter to be described, into batteries of desired emf, say 4 v. or greater, especially individual cells of about 2 v., useful particularly at low current demand, e.g., 0.125 amp per square inch of electrode area. They are useful for various purposes, as to charge condensers.

Cells made in accordance with this invention comprise a metallic anode, a metallic cathode, and a suitable solid electrolyte. The materials used for these elements may be chosen with a view to such factors as the electrical characteristics desired, economics, and the like, as the fabricator desires. However, it has been found that nickel, suitably in the form of the alloy, Inconel, is a very satisfactory base material from which the electrode blanks may be made. Part of the nickel blank can be coated with calcium which serves as the anode relative to an enclosed nickel electrode which then becomes the cathode. Alternatively, a sheet of calcium could be used for that purpose. Other typical electrode pairs include Mg-Cu, Mg-Fe, Mg-Pt, Ca-Fe and Ca-Ag. In each instance, the anode material can be coated on the cathode to provide the anode electrode.

A wide variety of electrolytes applicable in the practice of the invention are, of course, available. The major criteria are that the electrolyte shall be and remain solid and non-conductive until the cell is to function, that it shall become active, or conductive, when heated, as by actuation of an exothermic composition, and that it shall act as an electrolyte in cooperation with the electrodes to supply the desired current. The electrolyte should be thermally stable, and the melting point should be relatively low, e.g., 150° to 500° C to provide for fast activation by a small amount of heat and also for longer life for a given heat supply.

Thus, single salts or mixtures of salts having melting points applicable to any given case in question may be used. Commonly it is preferred to use eutectic compositions of two or more salts because thereby desired low melting compositions are supplied. Other important physical properties of the electrolyte are the boiling point, for the salt should not vaporize under the heat supplied, and the heat of fusion and the specific heat. The coefficient of thermal expansion is significant only in that the cell components should not show excessive relative dimensional changes in order to avoid creation of undesirable stresses within the cell.

Chemically, the electrolyte should, for most purposes, not undergo reactions, other than electrochemical, with the cell components, i.e., the electrodes or any electrolyte carrier that is used, although where brief action only is necessary the reactivity factor becomes unimportant. Likewise, the electrolyte should not ordinarily undergo gas liberating reaction within itself while heated.

Most suitably the electrolyte is supported by a carrier, of which a variety are available. The major criteria are that the carrier shall be and remain solid and non-conductive throughout the fabrication, storage, and functional life of the cell, be porous to the ionic migration of the fused electrolyte during the functional life of the cell, and by maintaining a definite thickness be a physical spacer between the electrodes when the electrolyte is molten. Thus metal oxides, asbestos fiber, glass fiber products, or ceramics of high melting point and insolubility applicable to any given case may be used. Commonly it is preferred to use a flexible tape woven or felted from fibers of a high melting point, insoluble, high dielectric material or from mixtures of two or more kinds of such fibers.

For many purposes it is now preferred to use an electrolyte pad consisting of an electrolyte carrier impregnated with electrolyte. Such electrolyte pads are prepared by passing a ribbon of cleaned woven fiberglass tape through a melt of the preferred electrolyte at a controlled temperature a controlled rate thereby controlling the weight of the electrolyte impregnated in the carrier. The impregnated tape is then cooled in such a manner that all components are solid. Electrolyte pads of preferred shape, composition and weight are then cut from the tape. Such electrolyte pads consist of two distinct components, one being the inert carrier portion that remains continuously solid throughout the fabrication, storage and functional life of the thermal cell, and the other being the electrolyte portion that is liquid during impregnation of the carrier, is solid during storage life of the thermal cell and is molten during the functional life of the thermal cell. Typical electrolytes useful in the practice of the invention are the lithium bromide-potassium bromide eutectic (m.p. 348° C), lithium hydroxide (m.p. 450° C), potassium hydroxide (m.p. 360° C), binary mixtures such as lithium nitrate-lithium hydroxide (m.p. 370°–380° C), the lithium chloride-potassium chloride eutectic (m.p. 364° C) and the lithium hydroxide-lithium chloride eutectic (m.p. 290° C).

With most combinations of electrodes and electrolytes a depolarizer is desirably present. This may be accomplished by the use of a variety of readily reducible oxidizing but thermally stable agents that may be incorporated in the electrolyte itself, or if the depolarizer tends to exert an undesirable action at the electron source it may be applied directly to the surface of the electron sink, or negative electrode. It is even possible to supply a depolarizer by chemical reaction within the cell. Among the depolarizers that will function in the electrolyte, potassium dichromate ($K_2Cr_2O_7$), potassium chromate ($K_2CrO_4$), molybdic oxide ($MoO_3$), and tungstic oxide ($WO_3$) have been found to be satisfactory with various electrode pairs. The depolarizer may be in solution or in suspension in the electrolyte, or be applied to one or both electrodes.

One mode of pasting depolarizer to an electrode is to paint the electron sink with a water slurry of tungstic oxide and lead chromate ($PbCrO_4$) and then applying heat; the lead chromate melts at a relatively low temperature and acts as a cement to hold the tungstic oxide in place. A negative electrode depolarizer found to be of value is composed of 4 parts of $WO_3$ and 1 part of $PbCrO_4$.

Deferred action thermal cells and batteries require a supply of heat to activate them. This is accomplished by associating with the cell or battery a combustible composition that undergoes exothermic reaction without the liberation of any substantial amount of gas. In general such compositions comprise an oxidizable substance and an oxidizing agent, with or without an inert diluent to modify the rate of reaction. For most purposes, I prefer compositions comprising one or more finely divided metals having high heats of combustion, as the oxidizable substance, and as the oxidizing agent any of a variety of inorganic substances that react therewith but without liberation of any substantial amount of gas, examples being chlorates, perchlorates and nitrates, particularly of the alkali metals, as well as chromates, iron oxide, manganese dioxide and others. The composition must, of course, be capable of ignition by such means as a percussion primer or the well-known electric matches. Also, it must be capable of liberating heat rapidly. Other criteria are that the composition must be stable under cell storage conditions, and have certain ignition at very low ambient temperatures.

The particular heating composition to be used will depend upon the requirements of the cell, such as the rapidity with which it is to function, the duration of its functional life, and the amount of heat necessary to effect those ends, as to fuse the electrolyte. Some of these exothermic compositions liberate larger amounts of heat, or react more rapidly, than others, so that the requirements of any particular cell can be supplied readily from the known compositions.

Likewise, the characteristics of these heat-liberating compositions may in general be modified by adding or altering the content of an inert diluent, such, for example, diatomaceous earth and similar incombustible and non-reactive materials. Of course, where the cells are subjected to such forces as shock, impact, centrifugal force, or high acceleration, the composition should be insensitive to such forces. By way of illustration, reference may be made to the following compositions that have been found to be satisfactory for the purposes of the invention.

The preferred heat-liberating composition is composed of 28 weight percent of zirconium metal powder (Zr) and powdered barium chromate ($BaCrO_4$). This composition readily ignites at the low temperature of $-65°$ F.

A mixture of zirconium metal (Zr) powder ($-200$ mesh) and powdered red iron oxide ($Fe_2O_3$) in stoichiometric proportions (43.5% Zr, 51.5% $Fe_2O_3$) with 5 percent by weight of diatomaceous earth as a diluent exhibits fast propagation of combustion with good heat capacity.

Another composition is composed of, by weight, 22 percent nickel (Ni) powder, 5 percent zirconium (Zr) powder, 16.8 percent potassium perchlorate ($KClO_4$) and 56.2 percent barium chromate ($BaCrO_4$). This composition ignites easily at low temperatures. It produces about 670 gram calories of heat per cubic centimeter after being compressed at 6000 psi. The relative percentages of the four components may be varied over a wide range to give various burning rates and various heats of combustion per unit volume. The composition just stated after being compressed at 12,000 psi burns at the rate of 0.1 inch per second, or a burning time of 10 seconds per inch. As exemplifying how the burning characteristics may be varied, if the percentage of zirconium be held constant and the nickel and potassium perchlorate be maintained in substantially stoichiometric ratio, with the barium chromate being varied as a diluent, a burning time of 3 seconds per inch is to be had with 25 percent of potassium perchlorate and 35.5 percent each of nickel powder and barium chromate. On the other hand, at approximately 12 percent of potassium perchlorate, 15 percent of nickel powder and 67 percent of barium chromate the burning time is increased to 18 seconds per inch.

When nickel is used in these compositions it is preferred that it be prepared by distillation of mercury (Hg) from a nickel-mercury amalgam as described and claimed in U.S. Pat. No. 1,893,879, issued Jan. 10, 1933, on an application filed by Joseph C. W. Frazer et al. Such nickel powder may be stabilized, if desired, as described and claimed in Pat. No. 2,487,632, issued Nov. 8, 1949, on an application filed by O. G. Bennett. This form of nickel powder is preferred because it has been found to be much more active in these combustible compositions than nickel produced in any other way.

Another composition is one consisting of 9.6 percent, by weight, of granular aluminum (Al) and the balance barium chromate. After being compressed at 10,000 psi it liberates 423 gram calories per gram.

From the foregoing it is evident that a typical cell would be composed of a nickel member coated with calcium to provide an anode, with a separate uncoated nickel sheet as the cathode. An electrolyte of the lithium bromide-potassium bromide eutectic is disposed between the opposing surfaces of the electrodes.

The invention will be described further in conjunction with the appended drawings in which:

FIG. 1 is a plan view of a battery assembly of cells made in accordance with this invention;

FIG. 2 is a plan view of a metal electrode blank with a partially coated surface such as is used for making the cells of FIG. 1, but on a smaller scale;

FIG. 3 is a plan view of an electrode blank for the end cell of a series forming a battery;

FIG. 4 is an inner electrode, including an integral terminal lead, that may be used in conjunction with the electrode of FIG. 3 to provide the pair of electrodes for an end cell;

FIG. 5 is a plan view of an end electrode structure that may be used as the final electrode in a battery using the electrodes of FIGS. 3 and 4 to form one end cell;

FIG. 6 is a cross-sectional view of a complete cell taken along line VI—VI of FIG. 1, showing the planar disposition of its components;

FIG. 7 is a cross-sectional view taken along line VII—VII of FIG. 1;

Figure 9:
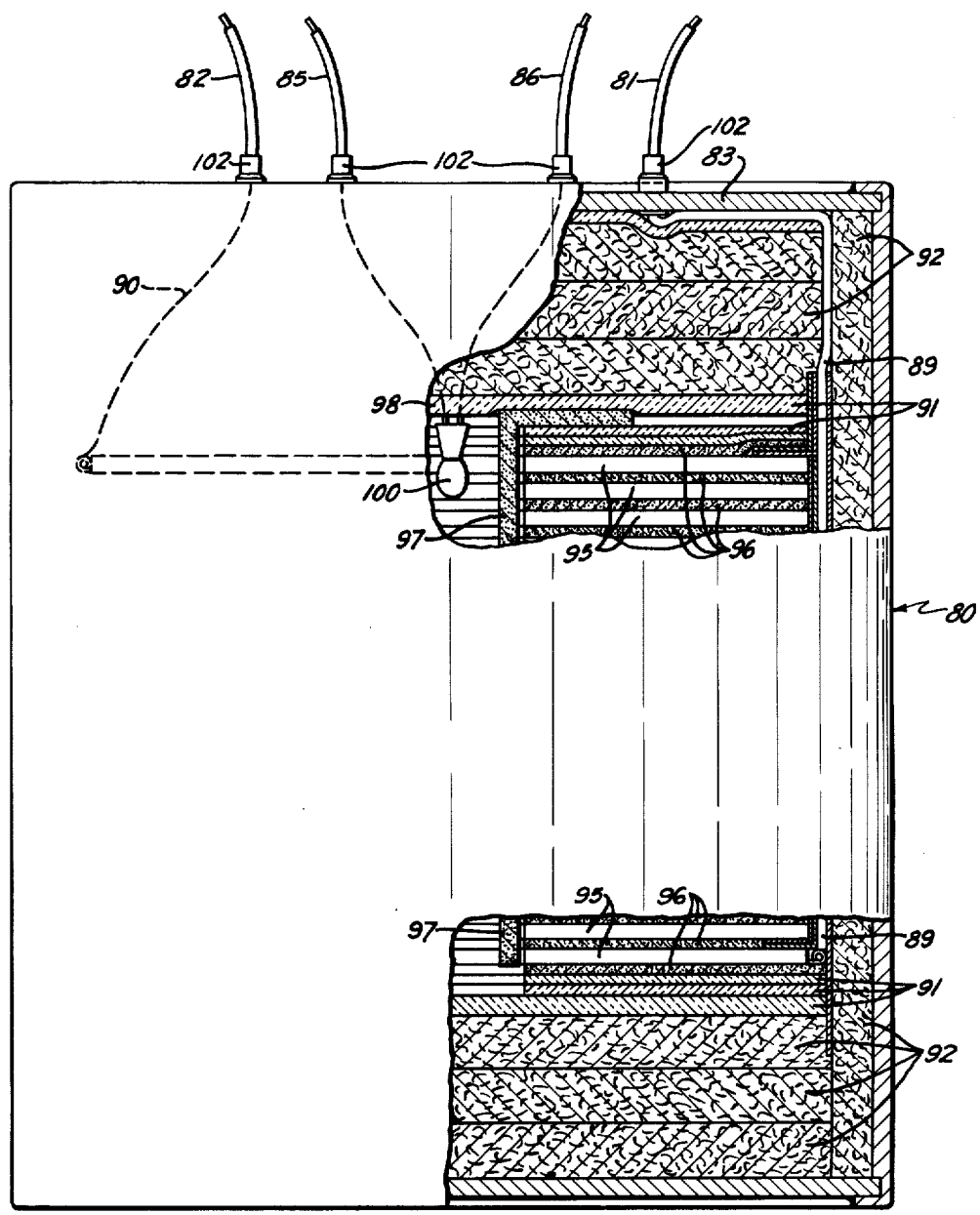
FIG. 9 is a side view, partly in section, of the battery of FIG. 8, but to a larger scale, taken along the line IX—IX of FIG. 8.

Referring to FIG. 1, the assembly of cells shown includes seven cells 10, 11, 12, 13, 14, 15 and 16, each constituted of a pair of electrodes and an electrolyte, as will be described hereinafter. An assembly of seven cells has been chosen for purposes of illustration, it being apparent that any other number of cells desired, greater or smaller, may be used. End cell 10 includes an inner electrode 17, as shown by the dotted lines, which has an extension 18 that constitutes one of the leads for the assembly. The other end cell 16 is provided with an extension 19, attached to its outside surface, that serves as a second lead for the assembly.

In the assembly of FIG. 1, there are three distinct cell structures, namely a first end cell 10, a second end cell 16 and central cells 11, 12, 13, 14 and 15. The central cells are constructed from a cell blank, e.g. of very light gauge (0.005 inch thick) sheet nickel, such as is shown in FIG. 2. The thin metal blank includes two areas 22 and 24 so shaped and sized as to be, in large part, substantial duplicates of one another. On one surface of areas 22 and 24 is a deposit 25 of a metal different from that of the blank. Suitably calcium is the second metal where a nickel base is used. The blank also includes a tab 26 that has an enlarged area 27 on its end. The tab serves as a lead between two cells and, since it is integral with parts of two different cells, also serves to hold adjacent cells rapidly together. The area 27 constitutes the central electrode of a cell 12 which is adjacent cell 11 for which the areas 22 and 24 serve as an electrode.

The electrode blank shown in FIG. 2 constitutes the preferred shape for this member. It can be observed that it is composed of two laterally spaced members that are integrally connected at adjacent edges by a strip. The larger of these two members is similar to a pair of isosceles triangles joined through their bases, where one of the triangles is truncated at its remote apex. The other of these members is also a truncated triangle and generally is slightly smaller than the truncated portion of the larger member. It will be appreciated that other shapes can be used for this electrode. For example a generally circular member that has a half circle member attached to its edge through a tab, or a rectangular or square member having laterally adjacent thereto a second member slightly smaller than one-half of its area could serve as well. Other shapes will occur to those skilled in the art.

To form the cell, the coated metal blank is partially folded along fold line F, FIG. 2, so that the coated areas approach face-to-face disposition whereupon they would form a U-shape, as viewed from a side. Prepared electrolyte pads, and depolarizer when used, are placed on each surface of an enlarged area, such as one like area 27 of the blank of FIG. 2 or of area 20 of the blank of FIG. 3 where this central cell is adjacent the first end cell, of an adjacent cell and the resultant unit is placed within the folded blank. The blank is then completely folded. Then the point section 28 of the electrode blank is bent around the blunt end 29 of area 24 to retain the folded electrode together and the central electrode and electrolyte pads within the cell.

The relative disposition of the various components in a central cell may be seen in the cross-sectional view of central cell 11 shown in FIG. 6. From top to bottom the parts are the point section 28, metal coating 25, area 24, the metal coating 25 thereon, a first elecrolyte pad 31, a depolarizer pad 32, central electrode 20, depolarizer pad 33, the second electrolyte pad 34 and the metal coating 25 on the area 22 of the electrode blank.

The first end cell 10 is formed from a blank that, suitably, has substantially the same size, shape, and metal deposit as that used for central cell 11 as just described. Such a blank is shown in FIG. 3 and differs from the blank of a central cell by the hole or slot 35 along fold line F. That slot is provided so that an end internal electrode terminal extension may be passed therethrough. Such an internal electrode 17 for a first end cell is shown in FIG. 4. The integral terminal is shown in extension 18.

The first end cell is formed by folding the mating areas 36 and 37, FIG. 3, so that the coated surfaces are face-to-face. Thereupon, a central electrode 17, FIG. 4, with prepared electrolyte and depolarizer pads on each surface, is placed within the folded blank with extension 18 projecting through the slot 35. The point 38 is then folded over the blunt end 39 in the same manner as was done with the central cell to close and hold it together.

The other end cell 16 is formed in a similar manner. However, the enveloping electrode of this cell is made from a special blank, shown in FIG. 5, and composed of the two mating areas 42 and 44, also coated on the surface with another metal. Attached to its other or outside surface, is an extension 19 that serves as a second terminal for the unit. Since this is the final cell of the assembly, it does not supply any other cell with an electrode; consequently, the blank does not have and does not need a tab and enlarged area. This cell is formed by folding the blank along its fold line until the coated areas are face-to-face and inserting, as a central electrode, the enlarged area 45 on the end of the tab 54 of the adjacent cell 15. Electrolyte and depolarizer pads are included as with the other cells. Thereupon the point 46 is folded around the blunt end 47 to hold the resulting unit together.

The assembly of cells of FIG. 1 thus includes a first end cell 10, a second end cell 16 and five central cells 11, 12, 13, 14 and 15, the cells being formed in the manner just described. It can be observed that the cells are arranged edge-to-edge and are connected to one another by the described tabs which extend from the edge of the covering or outer electrode of one cell to the central electrode of the next cell. Thus tab 50 of the first cell 10 joins it with the first central cell 11, tab 26 connects cells 11 and 12, tab 51 connects cells 12 and 13, tab 52 connects cells 13 and 14, tab 53 connects cells 14 and 15, and tab 54 connects cells 15 and 16, while the tabs are shown as extending from a central portion of the edge of a covering electrode, it will be apparent that the tabs may be located elsewhere with any desired configuration being developed as by bending the tabs to put the cells where they are wanted.

A cross-section of a tab and portions of two cells, specifically tab 50 and cells 10 and 11, is shown in FIG. 7. It will be observed that the tab 50 is bent or off-set so that the enlarged area 20 is easily disposed centrally of cell 11. It is apparent from what has been said that tabs serve as the inter-cell leads connecting the cathode of one cell with the anode of the other cell. This structure also contributes to the ruggedness of the assembly since the cells are physically interconnected through a member that has strength and which retains the cells in their spaced relationship since that member is integral with parts of two separate cells.

Figure 10:
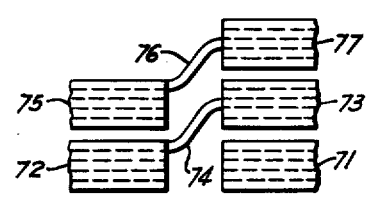
FIG. 10 shows an arrangement of end cells in which a large number of ring assemblies such as that of FIG. 1, can be series connected.

It was stated above that by the herein described arrangement, batteries of any electromotive force desired can be manufactured readily. This can be accomplished, for example, simply by bending or off-setting the tab member of an end cell into a plane above a first plane of cells and then completing a second ring of cells, and repeating that arrangement until the desired voltage is obtained. Such an arrangement is shown in FIG. 10. In that embodiment, cell 71 is a first end cell. Cell 72 is the final cell, though not an end cell, in the plane of cell 71. Cell 73 is the first cell in the next plane and is in series connection with the cells of the first plane through tab extention 74. Cell 75 is the final cell of the second plane and its tab extension 76 serves to connect cell 77 in series with the preceding cells. In that manner, any number of cells wanted can, conveniently, be put into a battery made according to this invention.

Of course, a series arrangement of a large number of cells may be obtained without connecting all of the cells as shown in FIG. 10. For example, basic battery units of predetermined voltage (and thus a predetermined number of cells) may be manufactured, each of the units being provided with two terminal members or leads. Then, when a battery with a higher electromotive force is desired, the appropriate number of basic units simply are series connected through their proper terminals. The flexibility of such a system is readily apparent. Another advantage is the fact that by use of basic units of cells a parallel connection, when the intended application requires it, may be made by connecting the anode terminals together and connecting the cathode terminals together in a stack of assemblies of cells.

Figure 8:
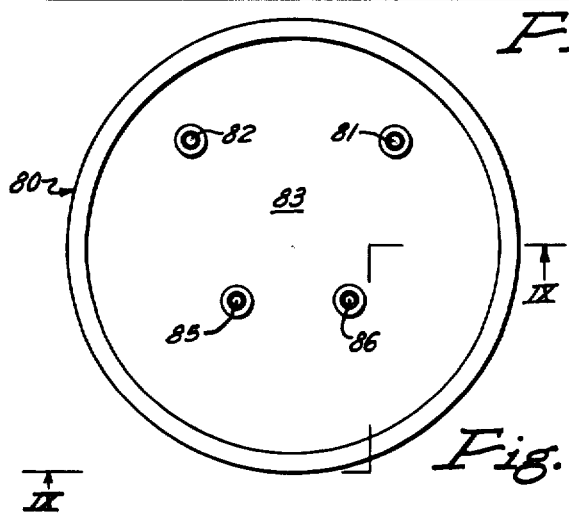
FIG. 8 is a top view of an assembled battery.

Batteries that are made in accordance with this invention include the completed individual cells, the battery terminals, a combustible material to activate the cells, a means to prime or actuate the combustible and a suitable casing. The structure of a typical battery is shown in FIGS. 8 and 9. A hermetically sealed canister or case 80, suitably of light gauge sheet iron or steel, is provided to receive a plurality of cell assemblies according to the voltage desired in the completed battery. The anode and cathode terminal leads 81 and 82, respectively, extend through the top 83 of the battery case for ready access upon use, as do the terminal leads 85 and 86 of an electric match combustion initiator.

In the battery shown, the cell units are series connected in the manner hereinbefore described. Consequently the first end cell and the final end cell are at opposite ends of the battery. In the embodiment shown, the terminal of the bottom end cell is an anode and is connected to its terminal lead 81 by wire 89 while the terminal of the top end cell is a cathode and is connected to the anode terminal 82 by wire 90.

Within the limits of operability of the combustion material used and similar considerations, the cell units may be placed in the battery case in any manner desired. An arrangement that I have found suitable involves lining the battery case with insulating and shock-absorbing material, such as asbestos and felt pads 91 and 92, respectively. Other suitable materials that can be used include, by way of example, mica strips and fiber glass cloth. These linings serve both as electrical insulation and as heat insulation, the latter to isolate the cells from the influence of ambient conditions and to retain heat from the combustible material in the area of the cells once the unit is actuated.

The assemblies of cells are arranged with heat pads, of any suitable composition as described hereinbefore, between adjacent assemblies, and are then placed in the case within the lining just described. The heat pads suitably are shaped like an assembly of cells and are provided with a central aperture so that a single powder train extended therethrough may serve a plurality of pads. In the drawing, the cell assemblies are designated 95, the heat pads are 96 and the powder train is 97. On the top of the stack of cells is placed a pad 98 containing the electric match 100 to set off the powder train, followed by layers of insulation and shock absorbing pads as desired. The powder train ignition means, which in this embodiment is electric match 100, suitably is placed adjacent the end of the train to insure ignition. The top member 83 is placed on top of the casing 80 with the battery leads and combustion initiator leads extending therethrough. The unit is then sealed about its edge and ceramic bushings 102 are fastened about the base of each lead.

Since one of the aims of this invention is to provide batteries of high emf without particular regard to the current output, it will be apparent that the size of each cell is not of particular importance since voltage is determined primarily by the electrode couple and the electrolyte involved. Consequently, the individual cells may be made as small as possible consonant with a degree of ease of fabrication and assembly that may be tolerated, since the size does not effect voltage. Small over-all dimensions permit the use of more of the cells, and hence provide higher emf per unit of battery size than is otherwise obtainable. The described structure, involving the physical interconnection of adjacent cells, avoids the problems of providing ruggedness and spacing that ordinarily would be expected with a large number of very small objects.

The cells and batteries of this invention may, of course, be used for any of the applications in which delayed action batteries now find use. As is apparent, the particular characteristic of the disclosed structure that is of most interest is the fact that rugged batteries of very high voltage per unit of size can now be manufactured. One application of such a battery is to charge condenser plates, for example in various air-borne applications.

In accordance with the provisions of the patent statutes, I have explained the principle of my invention and have described and illustrated what I now believe to represent its best embodiment. However, I desire to have it understood that, within the scope of the appended claims, the invention may be practiced otherwise than as specifically described and illustrated.

I claim:

1. A thermal cell electrode composed of a thin metal sheet in the form of two laterally spaced members integrally connected at adjacent edges by a strip, a first of said members being in the shape of a pair of isosceles triangles joined through their bases and in which the apex of the equal sides of one of said triangles is truncated, and the other of said members defining a truncated triangle smaller than the truncated portion of said first member.

2. In a battery, at least two cells including a first cell and a second cell spaced from, but adjacent to, the first cell, each of the cells having an anode and a cathode and having a solid electrolyte between the opposing surfaces of said electrodes in each cell, one of the electrodes in each of the cells being formed from a thin metal sheet in the form of two laterally spaced members integrally connected at adjacent edges by a strip, the first of said members being in the shape of a pair of isosceles triangles joined through their bases and in which the apex of one of the triangular portions is truncated, and the second of said members being in the shape of a truncated triangle smaller than the truncated triangular portion of said first member, said first member being folded along the line of joinder of the bases of its triangular portions so that the triangular portions thereof are in parallel planes, and the apex of the untrucated triangular portion being folded around the other triangular portion of said member at its truncated end whereby substantially flat folded electrodes each with open sides are formed, the second of said members of the metal sheet forming the folded electrode of the first cell being disposed in the folded electrode of the second cell, a second metal on the surfaces of one of the members of said thin metal sheet in one of said cells, whereby one of said members is an anode in one of the cells and the second member of the same metal sheet is a cathode in the second cell.

3. A battery of at least three cells comprising a first end cell constituted of an anode, a cathode and a solid electrolyte between the surfaces of said electrodes within said first end cell, one of said electrodes being formed of a thin metal sheet in the form of two laterally spaced members integrally connected at adjacent edges by a strip, the first of said members being in the shape of a pair of isosceles triangles joined through their bases and in which the apex of one of the triangular portions is truncated, and the second of said members being in the shape of a truncated triangle smaller than the truncated triangular portion of said first member, the first of said members being folded along the line of joinder of the bases of its triangular portions so that the triangular portions thereof are in parallel planes, and the apex of the untruncated triangular portion being folded around the other triangular portion of said member at its truncated end whereby a substantially flat folded electrode with open sides is formed, the other of said electrodes of the first end cell comprising a thin metal blank fitted within said folded electrode of that cell; at least one central cell constituted of an anode, a cathode and a solid electrolyte between the surfaces of said electrodes within said central cell, one of said electrodes of said central cell comprising the second member of the metal sheet forming the folded electrode of the first end cell, the other of said electrodes of the central cell being formed from a thin metal sheet in the form of two laterally spaced members integrally connected at adjacent sides by a strip, the first of said members being in the shape of a pair of isosceles triangles joined through their bases and in which the apex of one of the triangles is truncated, and the second of said members being in the shape of a truncated triangle smaller than the truncated triangular portion of said first member, the first of said members being folded along the line of joinder of the bases of its triangular portions so that the triangular portions thereof are in parallel planes, and the apex of the untruncated triangular portion of said member being folded around the other triangular portion of said member at its truncated end whereby a substantially flat folded electrode with open sides is formed; a second end cell constituted of an anode, a cathode and a solid electrolyte between the surfaces of said electrodes within said second end cell, one of said electrodes comprising the second member of the metal sheet folded to form the folded electrode of a central cell, the other of said electrodes of said second end cell being formed from a thin metal sheet in the form of two isosceles triangles joined through their bases and in which the apex of one of the triangles is truncated, the sheet being folded along the line of joinder of the bases of its triangular portions so that the triangular portions thereof are in parallel planes, and the apex of the untruncated triangular portion being folded around the other triangular portion of said member at its truncated end whereby a substantially flat folded electrode with open sides is formed; a metal lead in electrical contact with one of said electrodes of said first end cell; a second metal lead in electrical contact with one of said electrodes of said second end cell, the polarity of the electrode of said second end cell in contact with said second metal lead being different from the polarity of said electrode of said first end cell which is in contact with said first metal lead; and a second metal on the surface of one of said electrodes in each of said cells, said electrode having said second metal on its surface being the same electrode in every cell.

* * * * *